(12) United States Patent
Yamanaka

(10) Patent No.: US 7,760,770 B2
(45) Date of Patent: Jul. 20, 2010

(54) STREAM DATA PROCESSING APPARATUS AND STREAM DATA PROCESSING METHOD

(75) Inventor: Yuusuke Yamanaka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 573 days.

(21) Appl. No.: 11/806,302

(22) Filed: May 31, 2007

(65) Prior Publication Data

US 2007/0280301 A1 Dec. 6, 2007

(30) Foreign Application Priority Data

May 31, 2006 (JP) .................. P. 2006-151788

(51) Int. Cl.
*H04J 3/02* (2006.01)
(52) U.S. Cl. .................. 370/542; 370/395.62; 370/503; 370/509
(58) Field of Classification Search ................. 370/542, 370/543, 544, 352, 359, 395.62, 503, 509
See application file for complete search history.

(56) References Cited

U.S. PATENT DOCUMENTS

| 5,699,392 | A * | 12/1997 | Dokic ........................ 375/376 |
| 7,039,849 | B2 * | 5/2006 | Kono et al. ................... 714/775 |
| 2001/0043621 | A1 * | 11/2001 | Anderson et al. ........... 370/516 |
| 2003/0206605 | A1 * | 11/2003 | Anderson .................... 375/355 |
| 2004/0073949 | A1 * | 4/2004 | Chen et al. .................. 725/135 |
| 2005/0004940 | A1 * | 1/2005 | Ikeda ........................ 707/104.1 |
| 2005/0175322 | A1 * | 8/2005 | Demas et al. ................. 386/95 |
| 2006/0018387 | A1 * | 1/2006 | Jung et al. ............. 375/240.28 |
| 2007/0121620 | A1 * | 5/2007 | Yang et al. .................. 370/389 |
| 2007/0242678 | A1 * | 10/2007 | Fu et al. ................ 370/395.62 |

FOREIGN PATENT DOCUMENTS

JP 2003-101962 A 4/2003

* cited by examiner

*Primary Examiner*—Kwang B Yao
*Assistant Examiner*—Nguyen Ngo
(74) *Attorney, Agent, or Firm*—McDermott Will & Emery LLP

(57) ABSTRACT

A stream data processing apparatus includes a demultiplexing portion configured to demultiplex multiplexed stream data, to which a PCR is added, into a plurality of pieces of stream data to which a PTS is added, a system time measuring portion configured to measure a system time according to a PCR, a synchronous control portion configured to determine continuity of a reference time according to a PCR and system time information (SYC), to determine continuity of a reproduction time according to a PTS and an STC, and to output synchronous control information according to results of these determinations, a storage portion configured to store stream data, a decoding portion configured to decode stream data stored in the storage portion, an output portion configured to output decoded data, and a decoded data output control portion configured to control a mode of an operation of handling decoded data by the output portion, according to the synchronous control information. The synchronous control information designates output of decoded data, standby to output data, or discarding of data.

12 Claims, 11 Drawing Sheets

STREAM DATA PROCESSING APPARATUS AND STREAM DATA PROCESSING METHOD

BACKGROUND OF THE INVENTION

1. Field of the Invention

The present invention relates to a stream data processing apparatus and method, which demultiplex multiplexed stream data and decode stream data by an MPEG system.

2. Description of the Related Art

In a synchronous control operation of an MPEG system, system timer information (i.e., STC (System Time Clock)) obtained by a system timer operating according to reference time information (including PCR (Program Clock Reference)) added to multiplexed stream data is compared with reproduction time information (i.e., PTS (Presentation Time Stamp)) added to each piece of stream data, which is obtained by demultiplexing the multiplexed stream data. A reproducing unit provided with a stream data processing apparatus including the MPEG system operates differently depending upon the magnitude relation between the STC and the PTS. In a case where the STC is less than the PTS, the reproducing unit stands ready to reproduce data obtained by decoding the stream data. In a case where the STC is more than the PTS, the reproducing unit discards the data obtained by decoding the stream data. Also, the reproducing unit reproduces data obtained by decoding the stream data when the value represented by the STC reaches that represented by the PTS. In a case where the difference between the values respectively represented by the STC and the PTS is equal to or more than a threshold value, the reproducing unit determines that audio stream data and video stream data are asynchronously reproduced. Immediately, the reproducing unit reproduces the data obtained by decoding the stream data when the value represented by the STC reaches that represented by the PTS. Also, in a case where an overflow of a stream data buffer is detected, the audio stream data and the video stream data may be asynchronously output (see, for example, Patent Document 1).

Patent Document 1: JP-A-2003-101962

However, in a case where the continuity of values respectively represented by the PCR or the PTS is broken for some reason in the synchronous control operation, sometimes, the difference between the values respectively represented by the STC and the PTS is large. When the difference therebetween is equal to or more than the threshold value, the reproducing unit determines that the audio stream data and the video stream data are asynchronously reproduced. Consequently, the stream data are decoded and reproduced even at an undesired reproduction time. Thus, in a case where the continuity of the values respectively represented by the PCR or the PTS is broken, a desired synchronous control operation cannot be performed.

SUMMARY OF THE INVENTION

An object of the invention is to provide a stream data processing apparatus and a stream data processing method, which are enabled to perform a desired synchronous control operation in a case where the continuity of a time represented by the reference time information (PCR) and a time represented by the reproduction time information (PTS) is broken.

According to an aspect of the invention, there is provided a stream data processing apparatus, which includes a demultiplexing portion configured to demultiplex multiplexed stream data, to which reference time information is added, into a plurality of pieces of stream data to which reproduction time information is added, a system time measuring portion configured to measure a system time according to the reference time information, a synchronous control portion configured to determine continuity of a reference time according to the reference time information and system time information, to determine continuity of a reproduction time according to the reproduction time information and the system time information, and to output synchronous control information according to results of these determinations, a storage portion configured to store stream data, a decoding portion configured to decode stream data stored in the storage portion, an output portion configured to output decoded data, and a decoded data output control portion configured to control a mode of an operation of handling decoded data to be output by the output portion, according to the synchronous control information. The synchronous control information designates output of the data obtained by decoding the stream data, standby to output the data obtained by decoding the stream data, or discarding of the data obtained by decoding the stream data.

An embodiment of this stream data processing apparatus is configured so that in a case where a difference between a reference time represented by the reference time information and a system time represented by the system time information exceeds a predetermined threshold value, the synchronous control portion determines that the continuity of the reference time is broken, and that in a case where a first reproduction time represented by the reproduction time information and a second reproduction time represented by previous reproduction time information exceeds a second threshold value, the synchronous control portion determines that the continuity of the reproduction time is broken.

An embodiment of this stream data processing apparatus further comprises a time measuring unit configured to measure a time, and is adapted so that in a case where the synchronous control portion determines that the continuity of the reference time is broken, the synchronous control portion sets a system time represented by the system time information in said time measuring unit, and subsequently sets the reference time represented by the reference time information in said system time measuring portion, and is also adapted so that in a case where the synchronous control portion determines that the continuity of the reproduction time is broken, the synchronous control portion sets a time obtained by adding a difference between the first reproduction time and the second reproduction time to the system time in the time measuring unit.

Another embodiment of this stream data processing apparatus is adapted so that the synchronous control portion outputs, in a case where a difference between the first reproduction time and the system time is outside a predetermined range, synchronous control information corresponding to a difference between the first reproduction time and a time measured by the time measuring unit.

Another embodiment of the stream data processing apparatus further comprises a memory portion, and is adapted so that in a case where the synchronous control portion determines that the continuity of the reference time is broken, the synchronous control portion sets a difference between a system time represented by the system time information and the reference time represented by the reference time information in the memory portion, and subsequently sets the reference time represented by the reference time information in the system time measuring portion, and is also adapted so that in a case where the synchronous control portion determines that the continuity of the reproduction time is broken, the synchronous control portion sets a difference between the first reproduction time and the second reproduction time in the memory portion.

An embodiment of this stream data processing apparatus is adapted so that the synchronous control portion outputs, in a case where a difference between the first reproduction time and the system time is outside a predetermined range, synchronous control information corresponding to a difference between the first reproduction time and a time obtained by adding the difference that is stored by the memory portion.

Another embodiment of the stream data processing apparatus further comprises a memory portion, and is adapted so that in a case where the synchronous control portion determines that the continuity of the reference time is broken, the synchronous control portion sets the reference time represented by the reference time information, the system time represented by the system time information, and an amount of change in the system time in the memory portion, and subsequently sets the reference time represented by the reference time information in the system time measuring portion, and is also adapted so that in a case where the synchronous control portion determines that the continuity of the reproduction time is broken, the synchronous control portion causes the memory portion to store the reference time represented by the reference time information, the system time represented by the system time information, the amount of change in the system time, and a difference between the first reproduction time and the second reproduction time.

An embodiment of this stream data processing apparatus is adapted so that the synchronous control portion outputs, in a case where a difference between the first reproduction time and the system time is outside a predetermined range, synchronous control information corresponding to a difference between the first reproduction time and a value calculated from information stored in the memory portion.

According to another aspect of the invention, there is provided a stream data processing method, which comprises the steps of demultiplexing multiplexed stream data, to which reference time information is added, into a plurality of pieces of stream data to which reproduction time information is added, measuring a system time according to the reference time information, determining continuity of a reference time according to reference time information and system time information, and determining continuity of a reproduction time according to the reproduction time information and the system time information, and outputting synchronous control information according to results of the determinations, and controlling a mode of an operation of handling data, which is obtained by decoding the stream data, according to the synchronous control information. This stream data processing method is adapted so that the synchronous control information designates output of the data obtained by decoding the stream data, standby to output the data obtained by decoding the stream data, or discarding of the data obtained by decoding the stream data.

An embodiment of this stream data processing method is adapted so that in a case where a difference between a reference time represented by the reference time information and a system time represented by the system time information exceeds a predetermined threshold value, it is determined that the continuity of the reference time is broken, and that in a case where a first reproduction time represented by the reproduction time information and a second reproduction time represented by previous reproduction time information exceeds a second threshold value, it is determined that the continuity of the reproduction time is broken.

An embodiment of this stream data processing method is adapted so that in a case where the synchronous control portion determines that the continuity of the reference time is broken, a system time represented by the system time information is set in the time measuring unit, and subsequently, the reference time represented by the reference time information is set in the system time measuring portion, and is also adapted so that in a case where the synchronous control portion determines that the continuity of the reproduction time is broken, a time obtained by adding a difference between the first reproduction time and the second reproduction time to the system time is set in the time measuring unit.

An embodiment of this stream data processing method is adapted so that the synchronous control portion outputs, in a case where a difference between the first reproduction time and the system time is outside a predetermined range, synchronous control information corresponding to a difference between the first reproduction time and a time measured by the time measuring unit.

Another embodiment of the stream data processing method is adapted so that in a case where the synchronous control portion determines that the continuity of the reference time is broken, a difference between a system time represented by the system time information and the reference time represented by the reference time information is in the memory portion, and subsequently, the reference time represented by the reference time information is set in a system time measuring portion, and is also adapted so that in a case where the synchronous control portion determines that the continuity of the reproduction time is broken, a difference between the first reproduction time and the second reproduction time is set in the memory portion.

An embodiment of this stream data processing method is adapted so that in a case where a difference between the first reproduction time and the system time is outside a predetermined range, synchronous control information corresponding to a difference between the first reproduction time and a time obtained by adding the difference stored by the memory portion to the system is output.

Another embodiment of the stream data processing method is adapted so that in a case where it is determined that the continuity of the reference time is broken, the synchronous control portion sets the reference time represented by the reference time information, the system time represented by the system time information, and an amount of change in the system time are stored in a memory portion, and subsequently, the reference time represented by the reference time information is set in a system time measuring portion, and is also adapted so that in a case where it is determined that the continuity of the reproduction time is broken, the reference time represented by the reference time information, the system time represented by the system time information, the amount of change in the system time, and a difference between the first reproduction time and the second reproduction time are stored in the memory portion.

An embodiment of this stream data processing method is adapted so that the synchronous control portion outputs, in a case where a difference between the first reproduction time and the system time is outside a predetermined range, synchronous control information corresponding to a difference between the first reproduction time and a value calculated from information stored in the memory portion is output.

In accordance with the stream data processing apparatus and the stream data processing method according to the invention, a desired synchronous control operation can be performed even in a case where the continuity of a time represented by the reference time information (PCR) and a time represented by the reproduction time information (PTS) is broken.

DESCRIPTION OF THE PREFERRED EMBODIMENTS

Hereinafter, embodiments of the invention are described with reference to the accompanying drawings. Stream data processing apparatuses according to the following embodiments decode and reproduce each of pieces of stream data obtained by demultiplexing multiplexed stream data including audio stream data and video stream data, which are multiplexed by an MPEG system. Incidentally, reference time information (PCR) is added to the multiplexed stream data. Reproduction time information (PTS) is added to the demultiplexed stream data. The invention can be applied to cases where the kind and the number of stream data used in the embodiments are changed.

First Embodiment

Figure 1:
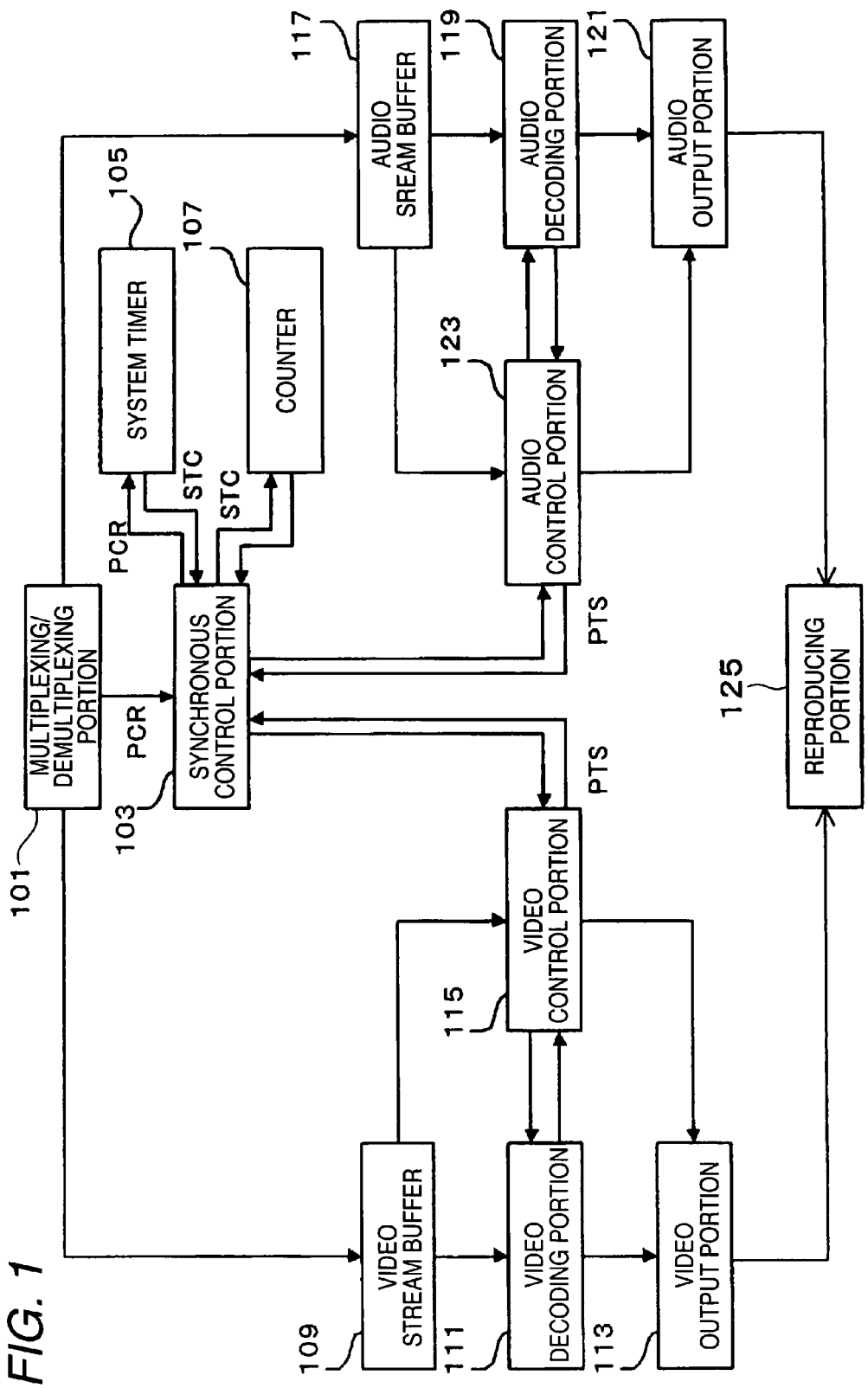
FIG. 1 is a block diagram illustrating the configuration of a stream data processing apparatus according to a first embodiment of the invention.

FIG. 1 is a block diagram illustrating the configuration of a stream data processing apparatus according to a first embodiment of the invention. As shown in FIG. 1, the stream data processing apparatus according to the first embodiment includes a multiplexing/demultiplexing portion 101, a synchronous control portion 103, a system timer 105, a counter 107, a video stream buffer 109, a video decoding portion 111, a video output portion 113, a video control portion 115, an audio stream buffer 117, an audio decoding portion 119, an audio output portion 121, an audio control portion 123, and a reproducing portion 125.

The multiplexing/demultiplexing portion 101 demultiplexes multiplexed stream data. Video stream data and audio stream data are obtained by demultiplexing the multiplexed stream data. The multiplexing/demultiplexing portion 101 causes a video stream buffer 109 to store the video stream data. Also, the multiplexing/demultiplexing portion 101 causes an audio stream buffer 117 to store the audio stream data. Further, a PCR added to the multiplexed stream data is sent to the synchronous control portion 103, while a PTS added to the video stream data is stored in the video stream buffer 109. The PTS added to the audio stream data is stored in the audio stream buffer 117.

The synchronous control portion 103 sets the PCR sent from the multiplexing/demultiplexing portion 101 in the system timer 105. Incidentally, in a case where the synchronous control portion 103 detects discontinuity of the value represented by the PCR, the synchronous control portion 103 acquires system time information (STC) from the system timer 105 and sets the STC in the counter 107.

Additionally, the synchronous control portion 103 compares the STC obtained from the system timer 105 with the PTS obtained from the video control portion 115. Then, the synchronous control portion 103 sends synchronous control information to the video control portion 115. Similarly, the synchronous control portion 103 compares the STC obtained from the system timer 105 with the PTS obtained from the audio control portion 123. Then, the synchronous control portion 103 sends synchronous control information to the audio control portion 123. In a case where the discontinuity of the value represented by the PTS is detected by comparing the STC with the PTS, the synchronous control portion 103 set a value, which is obtained by adding a difference between the value represented by the PTS received this time and the value represented by the PTS received the last time to the STC in the counter 107. If the difference between the STC and the PTS is equal to or larger than a threshold value, the value represented by the PTS is compared with the value set in the counter 107. Then, synchronous control information corresponding to a result of the comparison is sent to the video control portion 115 or to the audio control portion 123. Details of an operation of the synchronous control portion 103 will be described later.

The system timer 105 measures a system time according to the PCR sent from the synchronous control portion 103. The measured system time is output to the synchronous control portion 103 as system time information (STC). The counter 107 measures a time according to the STC sent from the synchronous control portion 103.

The video stream buffer 109 stores video stream data sent from the multiplexing/demultiplexing portion 101. The video decoding portion 111 reads and decodes video stream data from the video stream buffer 109 under the control of the video control portion 115. The video decoding portion 111 informs the video control portion 115 of a result of decoding. Incidentally, a result of decoding includes reproduction time information (PTS) added to decoded video stream data. Data decoded by the video decoding portion 111 is sent to the video output portion 113. Under the control of the video control portion 115, the video output portion 113 outputs the data sent from the video decoding portion 111 to the reproducing portion 125, alternatively stands ready to output the data to the reproducing portion 125, alternatively, discards the data.

The video control portion 115 reads information, which indicates a state of storing video stream data, from the video stream buffer 109. Further, the video control portion 115 instructs the video decoding portion 111 to read video stream data from the video stream buffer 109 and decode the read video stream data according to the information read from the video stream buffer 109. Also, the video control portion 115 receives a signal representing a result of decoding from the video decoding portion 111, and informs the synchronous control portion 103 of a PTS included in the signal representing the result of decoding. Furthermore, the video control portion 115 controls an operation of the video output portion 113 according to the synchronous control information sent from the synchronous control portion 103. Details of an operation of the video output portion 113 under the control of the video control portion 115 will be described later.

The audio stream buffer 117 stores audio stream data sent from the multiplexing/demultiplexing portion 101. The audio decoding portion 119 reads audio stream data from the audio stream buffer 117 and decodes the read data under the control of the audio control portion 123. The audio decoding portion 119 informs the audio control portion 123 of a result of decoding. Incidentally, the result of decoding includes reproduction time information (OTS) added to the decoded audio stream data. The data decoded by the audio decoding portion 119 is sent to the audio output portion 121. Under the control of the audio control portion 123, the audio output portion 121 outputs the data sent from the audio decoding portion 119 to the reproducing portion 125, alternatively, stands ready to output the data to the reproducing portion 125, alternatively, discards the data.

The audio control portion 123 reads information, which indicates a state of storing audio stream data, from the audio stream buffer 117. Further, the audio control portion 123 instructs the audio decoding portion 119 to read video stream data from the audio stream buffer 117 and decode the read video stream data according to the information read from the audio stream buffer 117. Also, the audio control portion 123 receives a signal representing a result of decoding from the audio decoding portion 119, and informs the synchronous control portion 103 of a PTS included in the signal representing the result of decoding. Furthermore, the audio control portion 123 controls an operation of the audio output portion 121 according to the synchronous control information sent from the synchronous control portion 103. Details of an operation of the audio output portion 121 under the control of the audio control portion 123 will be described later.

The reproducing portion 125 reproduces video data sent from the video output portion 113 and audio data sent from the audio output portion 121.

Figure 2:
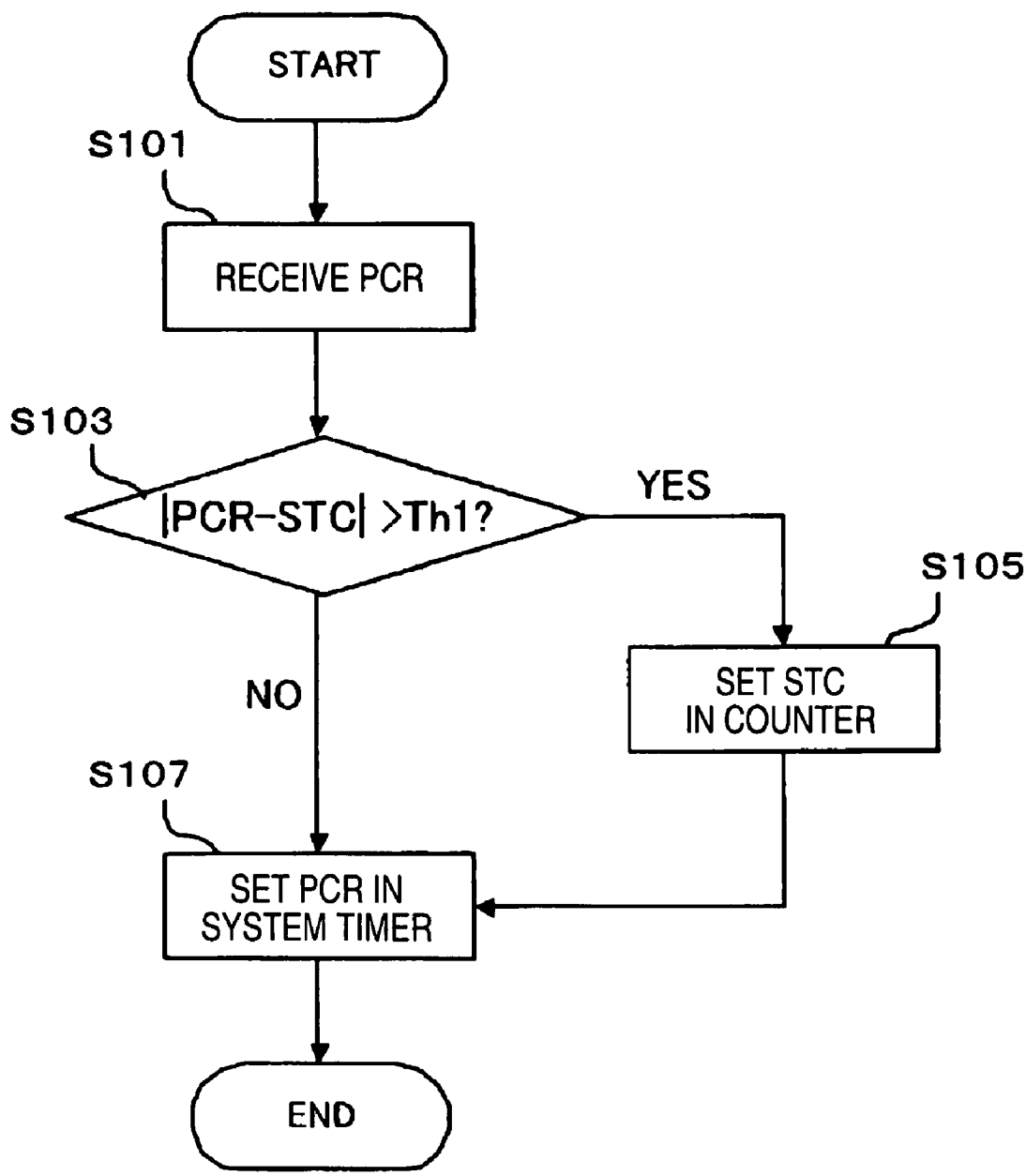
FIG. 2 is a flowchart illustrating an operation of a synchronous control portion of the first embodiment, which is performed when receiving a PCR from a multiplexing/demultiplexing portion.

Hereinafter, an operation of the synchronous control portion 103 of the first embodiment is described in detail with reference to FIGS. 2 and 3. FIG. 2 is a flowchart illustrating an operation of the synchronous control portion 103 of the first embodiment at the time of receiving a PCR from the multiplexing/demultiplexing portion 101. As shown in FIG. 2, the synchronous control portion 103 receives a PCR from the multiplexing/demultiplexing portion 101 in step S101. Subsequently, in step S103, the synchronous control portion 103 compares this PCR with the STC received from the system timer 105, and determines whether the following inequality holds: |PCR−STC|>Th1 where "Th1" is a threshold value that is a positive numerical value. If it is determined in step S103 that |PCR−STC|>Th1 (YES), the synchronous control portion 103 determines that the value represented by the PCR is discontinuous. Then, the synchronous control portion 103 acquires an STC and sets this STC in the counter 107 in step S105. Upon completion of processing in step S105, the synchronous control portion 103 sets the PCR in the system timer 105 in step S107. Conversely, if it is determined in step S103 that |PCR−STC|≦Th1 (NO), the synchronous control portion 103 proceeds to step S107 without setting the STC in the counter 107.

Thus, if the synchronous control portion 103 determines that the value represented by the PCR is discontinuous, the STC acquired by the system timer 105 is set in the counter 107. Accordingly, a time, which is before the continuity of the value represented by the PCR is broken, along a time base can be measured.

Figure 3:
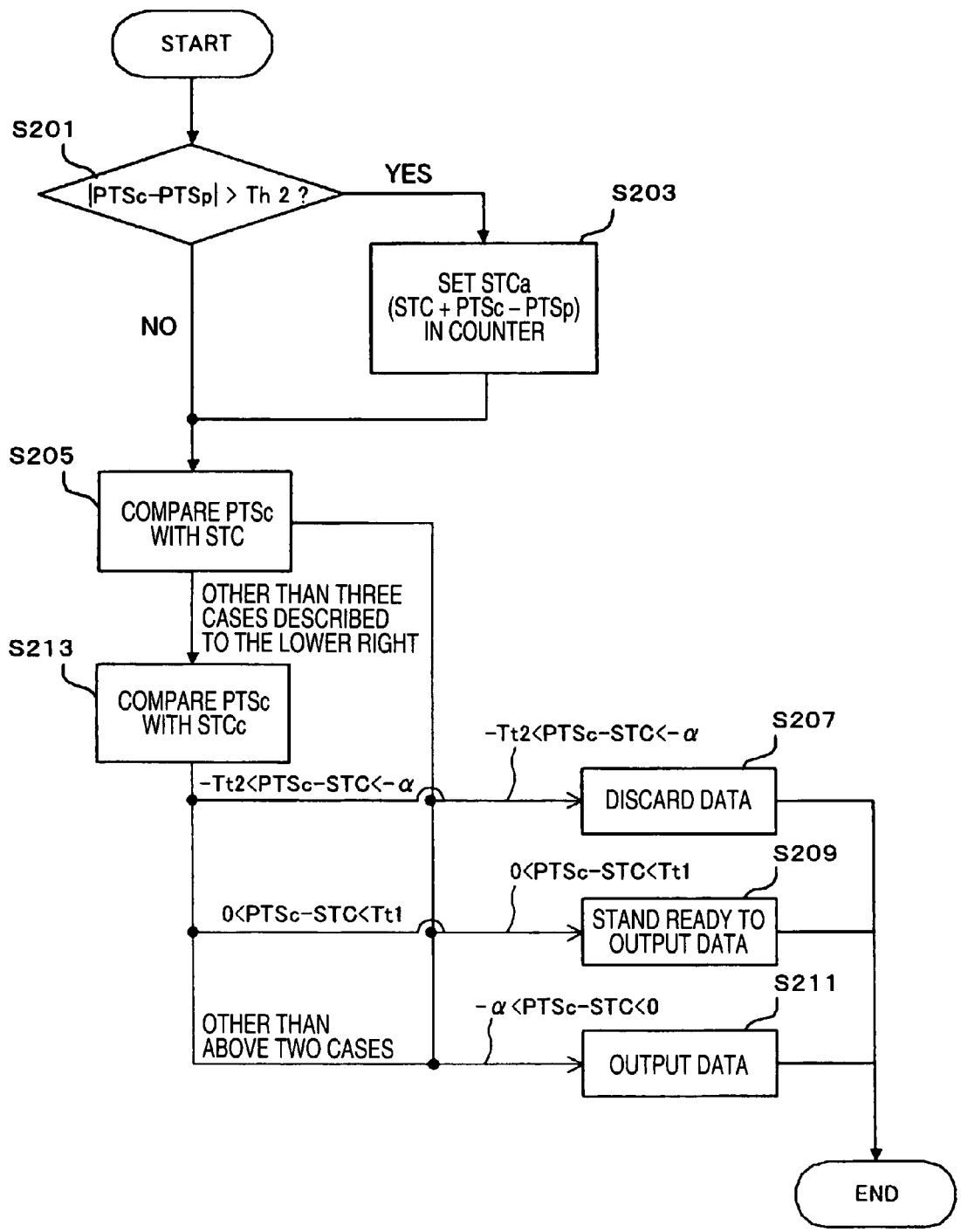
FIG. 3 is a flowchart illustrating an operation of the synchronous control portion of the first embodiment, which is performed when receiving a PTS from a video control portion or an audio control portion.

FIG. 3 is a flowchart illustrating an operation of the synchronous control portion 103 of the first embodiment at the time of receiving a PTS from the video control portion 115 or from the audio control portion 123. As shown in FIG. 3, the synchronous control portion 103 compares a received PCR (PTSc) with a PTS received the last time (PTSp), and determines in step S201 whether the following inequality holds: |PTSc−PTSp|>Th2 where "Th2" is a threshold value that is a positive numerical value. If it is determined in step S201 that |PTSc−PTSp|>Th2 (YES), the synchronous control portion 103 determines that the value represented by the PTS is discontinuous. Then, in step S203, the synchronous control portion 103 sets a value (STCa), which is obtained by adding a value "PTSc−PTSp" to the STC obtained from the system timer 105, in the counter 107. Upon completion of processing in step S203, the synchronous control portion 103 compares the PTSc with the STC measured by the system timer 105 in step S205. Conversely, if it is determined in step S203 that |PTSc−PTSp|≦Th2 (NO), the synchronous control portion 103 advances to step S205 without setting the STCa in the counter 107.

If it is determined in step S205 that "−Tt2<PTSc−STC<−α", the synchronous control portion 103 sends synchronous control information, which designates the discarding of data, to the video control portion 115 or to the audio control portion 123 in step S207. Alternatively, in a case where "0<PTSc−STC<Tt1 where Tt1 is a positive value", the synchronous control portion 103 sends synchronous control information, which designates the standby to output data, to the video control portion 115 or to the audio control portion 123 in step S209. Alternatively, in a case where "−α<PTSc−STC<0", the synchronous control portion 103 sends synchronous control information, which designates output of data, to the video control portion 115 or to the audio control portion 123 in step S211. In a case where it is determined in step S205 that none of these three conditions are met, that is, in a case where "Tt1≦PTSc−STC" or "PTSc−STC≦−Tt2", the synchronous control portion 103 determines that audio stream data and video stream data are asynchronously reproduced. Then, in step S213, the synchronous control portion 103 compares the PTSc with a time (STCc) measured by the counter 107 in step S213.

In a case where it is determined in step S213 that "−Tt2<PTSc−STC<−α", the synchronous control portion 103 proceeds to step S207 in which the synchronous control portion 103 sends synchronous control information designating the discarding of data to the video control portion 115 or to the audio control portion 123. Alternatively, in a case where "0<PTSc−STC<Tt1", the synchronous control portion 103 proceeds to step S209 and sends synchronous control information, which designates the standby to output data, to the video control portion 115 or to the audio control portion 123 in step S209. Alternatively, in a case where none of these two conditions are met, that is, in a case where "Tt1≦PTSc−STC" or "PTSc−STC≦−Tt2", the synchronous control portion 103 proceeds to step S213 and sends synchronous control information, which designates the output of data, to the video control portion 115 or to the audio control portion 123.

Thus, if the synchronous control portion 103 determines in step S201 that the value represented by the PTS is discontinuous, the STCa obtained by adding the difference between the PTS received this time (PTSc) and the PTS received the last time to the STC is set in the counter 107. Thus, a time, which is after the continuity of the value represented by the PTS is broken, along a time base can be measured. Also, even if it is determined by the comparison processing in step S205 that audio stream data and video stream data are asynchronously reproduced, synchronous control information designating an operation appropriate for situation of data processing performed by the video output portion 113 or the audio output portion 121 can be sent to the video control portion 115 and the audio control portion 123.

Figure 4:
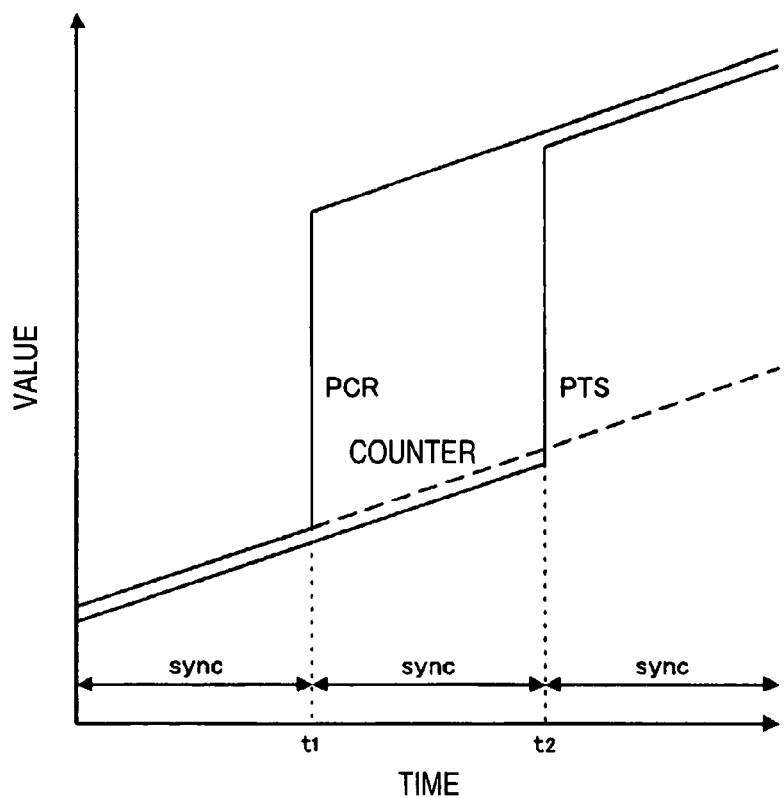
FIG. 4 is a graph illustrating a state in which the continuity of values respectively represented by the PCR and the PTS.
Figure 5:
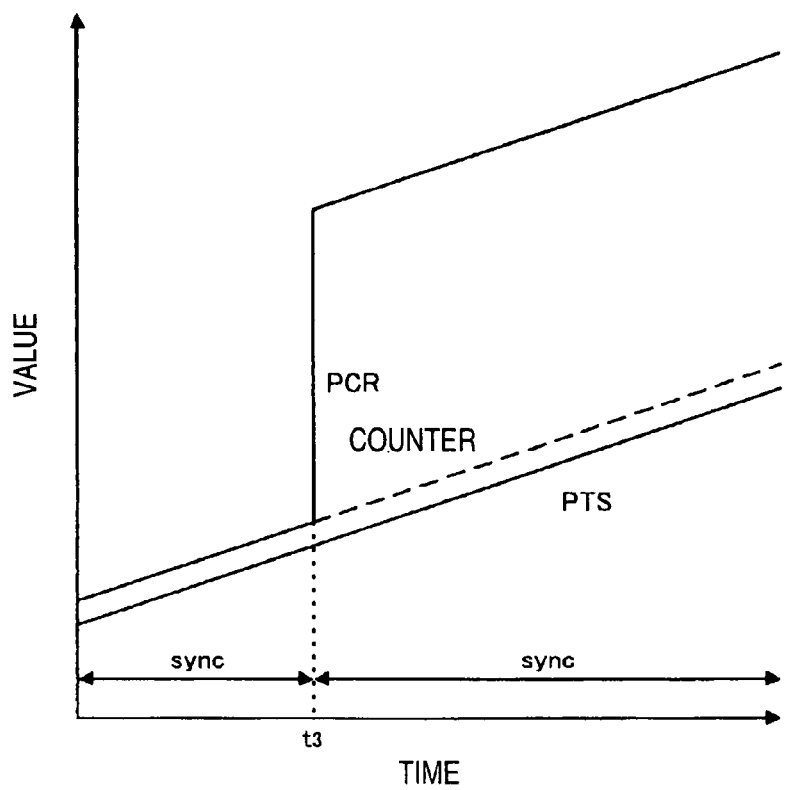
FIG. 5 is a graph illustrating a state in which the continuity of a value represented by the PCR.
Figure 6:
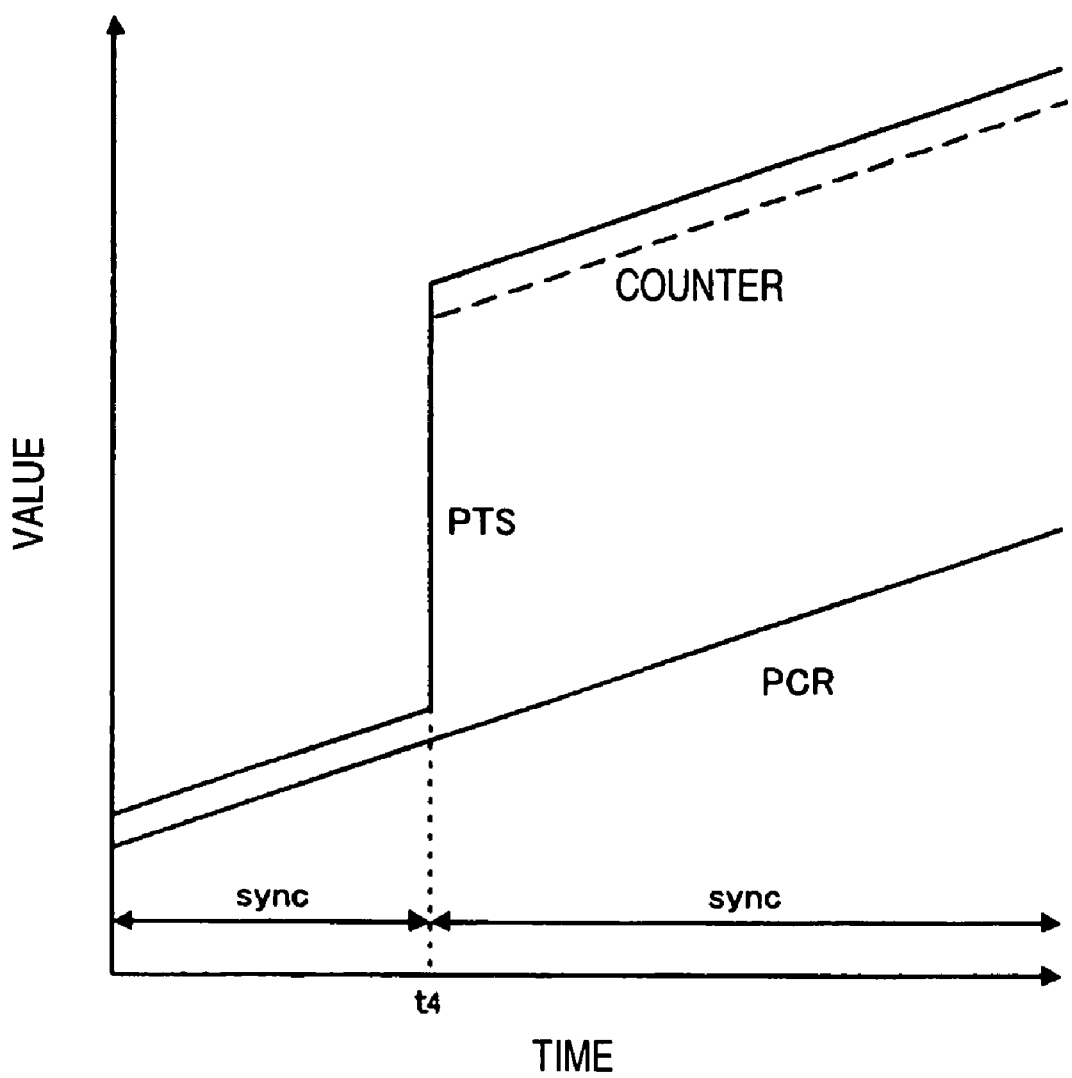
FIG. 6 is a graph illustrating a state in which the continuity of a value represented by the PTS.

FIGS. 4, 5, and 6 are graphs illustrating in a case where the continuity of the value represented by the PCR and/or the value represented by the PTS is broken, the relation among the values respectively represented by the PCR and the PTS and time. In each of the figures, abscissas represent real time, while ordinates denote values respectively represented by the PCR and the PTS.

As illustrated in the graph shown in FIG. 4, the continuity of the value represented by the PCR is broken at time t1. The value represented by the PTS catches up with that represented by the PCR at time t2. In a case where the stream data processing apparatus according to the present invention is not used, the difference between the values represented by the PCR and the PTS is large in a time period between time t1 and time t2. Thus, it is determined that audio stream data and video stream data are asynchronously reproduced. However, in the case of using the stream data processing apparatus according to the present embodiment, even if it is determined in step S103 shown in FIG. 2 that the value represented by the PCR is discontinuous at time t1, the STC is set in the counter 107 in step S105. Consequently, the counter 107 starts to measure a time, which is before the continuity of the value represented by the PCR is broken, along a time base. In the time period between time t1 and time t2, it is determined in step S205 shown in FIG. 3 that audio stream data and video stream data are asynchronously reproduced. However, in step S213, the value represented by the PTS is compared with a time measured by the counter 107. Thus, it is determined that audio stream data and video stream data are reproduced in synchronization with each other. Additionally, if the value represented by the PTS catches up with that represented by the PCR at time t2, it is determined in step S205 that audio stream data and video stream data are reproduced in synchronization with each other. Thus, according to the present embodiment, even when the continuity of the value represented by the PCR is broken, a desired synchronous control operation is performed.

As illustrated in the graph shown in FIG. 5, the continuity of the value represented by the PCR is broken at time t3. According to the present embodiment, even when it is determined in step S103 that audio stream data and video stream data are asynchronously reproduced, the counter 107 starts to measure a time, which is before the continuity of the value represented by the PCR is broken, along a time base. Although it is determined in step S205 that audio stream data and video stream data are asynchronously reproduced at time t3 or later, it is determined in step S213 that audio stream data and video stream data are reproduced in synchronization with each other. Thus, according to the present embodiment, even when the continuity of the value represented by the PCR is broken, a desired synchronous control operation is performed.

As illustrated in the graph shown in FIG. 6, the continuity of the value represented by the PTS is broken at time t4. According to the present embodiment, it is determined in step S201 shown in FIG. 3 that the value represented by the PTS is discontinuous at time t4. In step S203, a value (STCa) obtained by adding the difference between the value represented by the PTS received this time and that represented by the PTSp received the last time to the value represented by the STC is set in the counter 107. Thus, the counter 107 starts to measure a time, which is after the continuity of the value represented by the PTS is broken, along a time base. Although it is determined in step S205 that audio stream data and video stream data are asynchronously reproduced at time t4 or later, it is determined in step S213 that audio stream data and video stream data are reproduced in synchronization with each other. Thus, according to the present embodiment, even when the continuity of the value represented by the PTS is broken, a desired synchronous control operation is performed.

As described above, in the stream data processing apparatus according to the present embodiment, even in a case where the continuity of the time represented by the reference time information (PCR) is broken, the counter 107 measures a time, which is before the continuity of the time represented by the reproduction time information is broken, along a time base. Thus, a desired synchronous control operation is performed.

Second Embodiment

Figure 7:
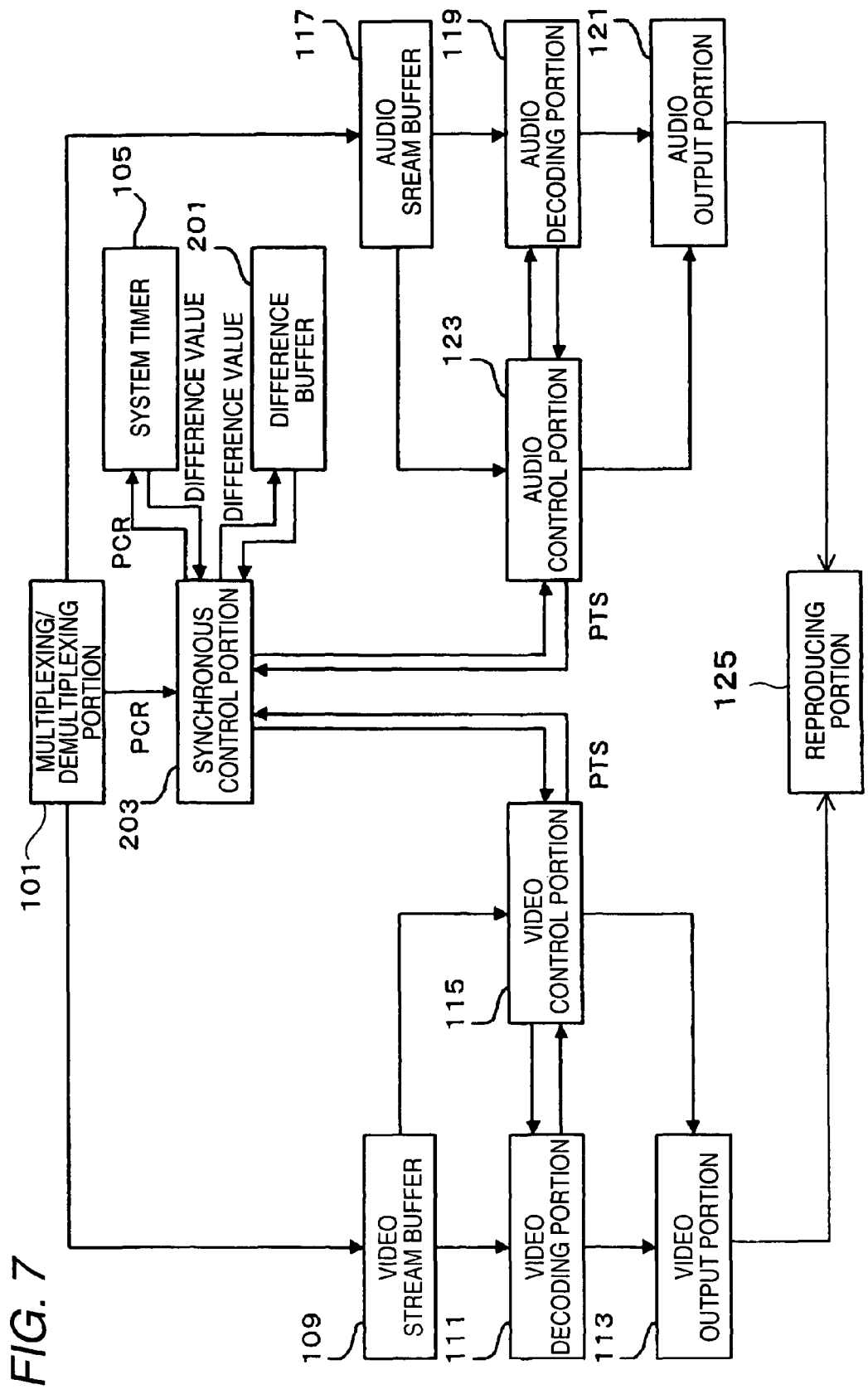
FIG. 7 is a block diagram illustrating the configuration of a stream data processing apparatus according to a second embodiment of the invention.

FIG. 7 is a block diagram illustrating the configuration of a stream data processing apparatus according to the second embodiment. The stream data processing apparatus according to the second embodiment differs from the stream data processing apparatus according to the first embodiment in that a difference buffer 201 is provided instead of the counter 107, in that even in a case where the continuity of the value represented by the PCR is broken, the synchronous control portion 203 causes the difference buffer 201 to store the difference between the values respectively represented by the PCR and the STC, and in that in a case where the continuity of the value represented by the PTS is broken, the synchronous control portion 203 causes the difference buffer 201 to store the difference between the values respectively represented by the PTS received this time and the PTS received the last time. The second embodiment is similar to the first embodiment except for these respects. In FIG. 7, composing elements common to the first and second embodiments are designated by same reference numerals.

The difference buffer 201 stores the difference between the values respectively represented by the PCR and the STC or the difference between the values respectively represented by the PTS received this time and the PTS received the last value.

Figure 8:
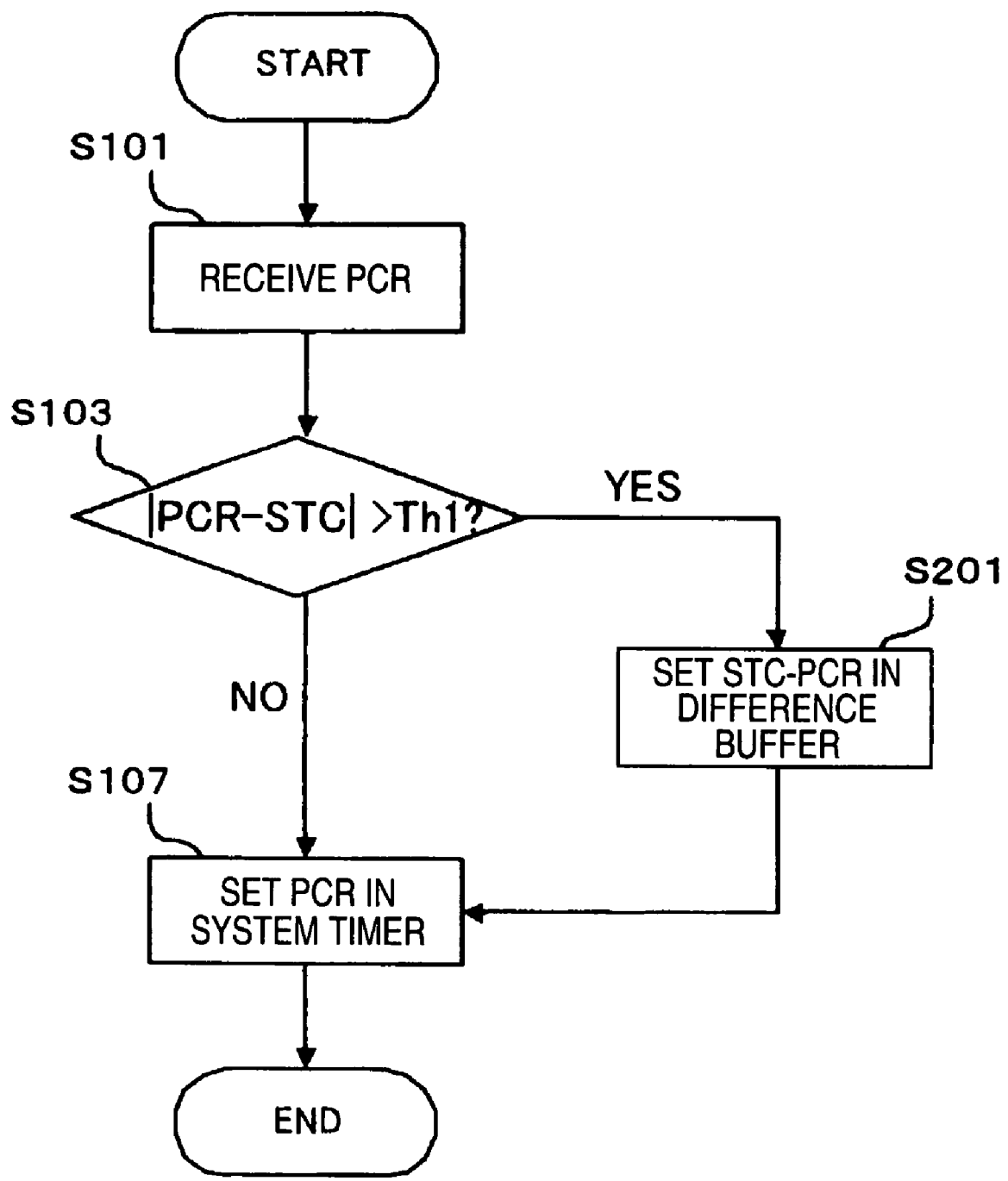
FIG. 8 is a flowchart illustrating an operation of a synchronous control portion of the second embodiment, which is performed when receiving a PCR from a multiplexing/demultiplexing portion.

FIG. 8 is a flowchart illustrating an operation of a synchronous control portion 203 according to the second embodiment at the time of receiving the PCR from the multiplexing/demultiplexing portion 101. The operation illustrated by the flowchart shown in FIG. 8 differs from the operation of the first embodiment illustrated by the flowchart shown in FIG. 2 in that processing in step S301 is performed instead of processing in step S105. In step S301, the synchronous control portion 203 acquires an STC from the system timer 105 and causes the difference buffer 201 to store the difference between the values respectively represented by the STC and the PCR. Thus, if the synchronous control portion 203 determines that the value represented by the PCR is discontinuous, the difference between the values represented by the STC and the PCR is referred to. Consequently, a time, which is before the continuity of the value represented by the PCR is broken, along a time base can be measured.

Figure 9:
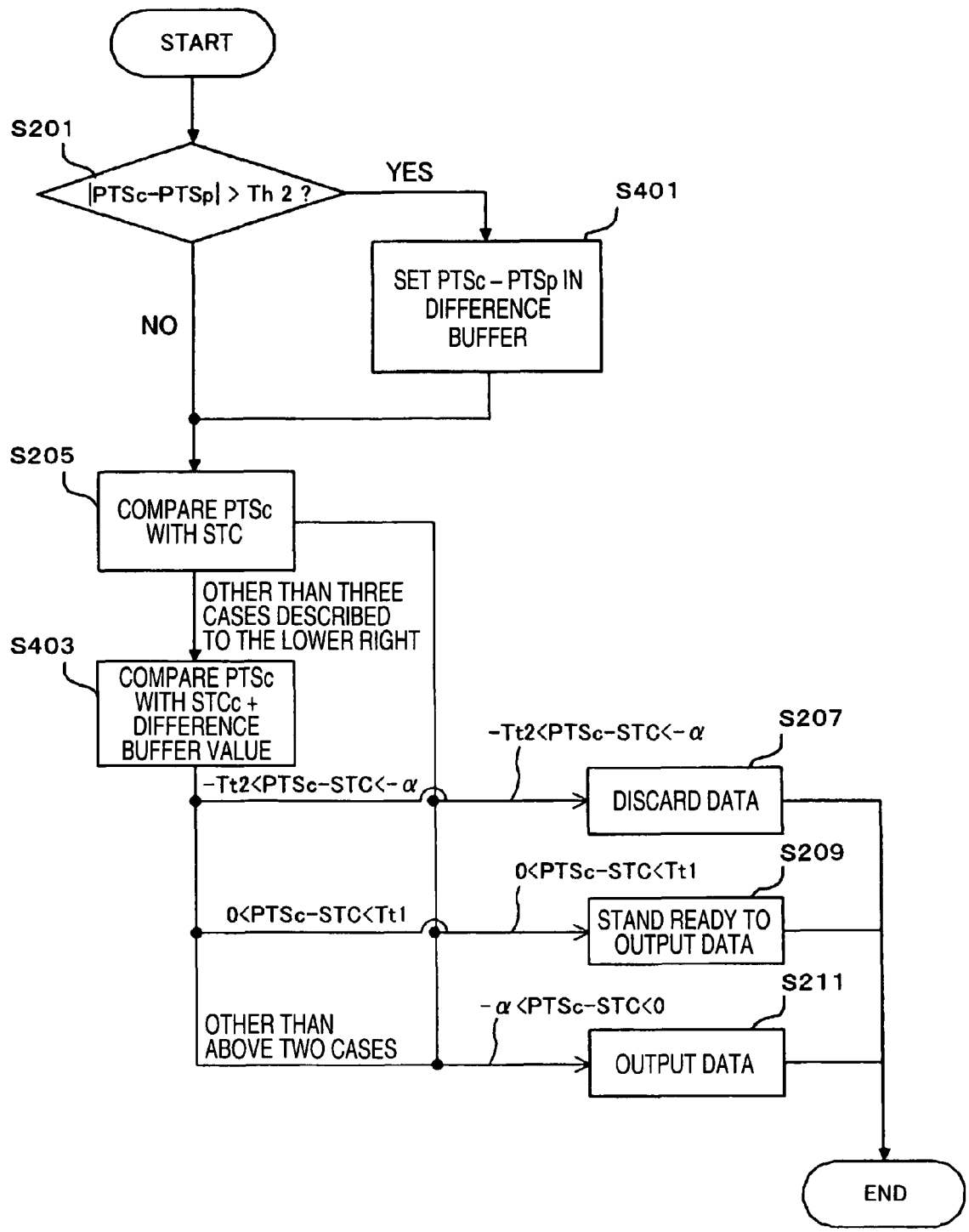
FIG. 9 is a flowchart illustrating an operation of the synchronous control portion of the second embodiment, which is performed when receiving a PTS from a video control portion or an audio control portion.

FIG. 9 is a flowchart illustrating an operation of the synchronous control portion 203 according to the second embodiment at the time of receiving a PTS from the video control portion 115 or the audio control portion 123. The operation illustrated by the flowchart shown in FIG. 9 differs from the operation of the first embodiment illustrated by the flowchart shown in FIG. 3 in that processing in step S401 is performed instead of processing in step S203, and that processing in step S401 is performed instead of processing in step S213. In step S401, the synchronous control portion 203 causes the difference buffer 201 to store the difference ("PTSc−PTSp") between the value represented by the PTS (PTSc) received this time and the value represented by the PTS (PTSp) received the last time. Also, in step S403, the synchronous control portion 203 compares the value represented by the PTSc with a value obtained by adding a value stored in the difference buffer to the value represented by the STCc. Thus, when the synchronous control portion 203 determines in step S201 that the value represented by the PTS is discontinuous, the difference between the value represented by the PTS (PTSc) received this time and the value represented by the PTS (PTSP) received the last time is referred to. Consequently, a time, which is after the continuity of the value represented by the PTS is broken, along a time base can be measured.

Third Embodiment

Figure 10:
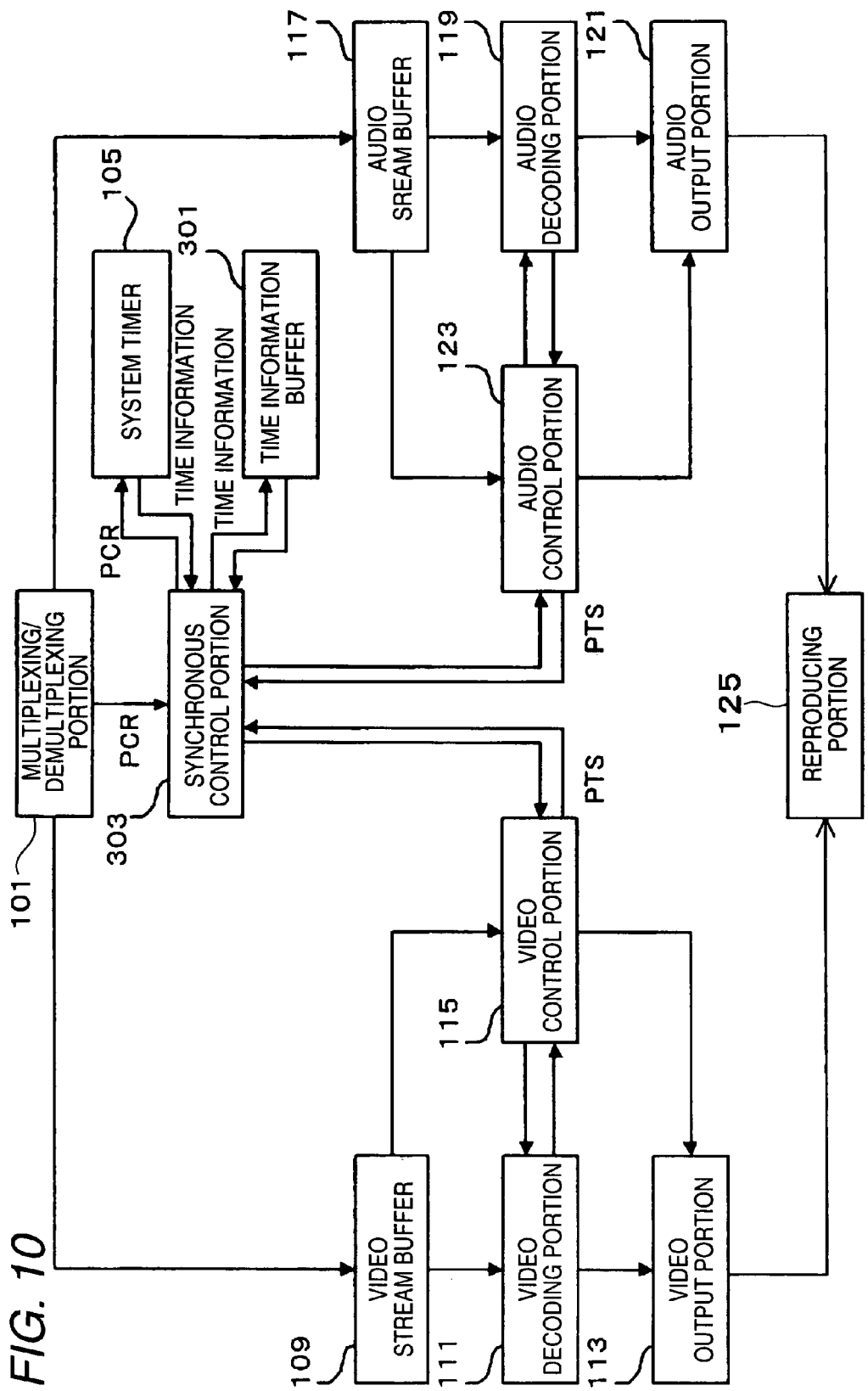
FIG. 10 is a block diagram illustrating the configuration of a stream data processing apparatus according to a third embodiment of the invention.

FIG. 10 is a block diagram illustrating the configuration of a stream data processing apparatus according to a third embodiment of the invention. The stream data processing apparatus according to the third embodiment differs from the stream data processing apparatus according to the first embodiment in that a time information buffer 301 is provided instead of the counter 107, in that in a case where the continuity of the value represented by the PCR is broken, the synchronous control portion 303 causes the time information buffer 301 to store the value represented by the PCR, the value represented by the STC, an amount of change in the STC, and the difference between the value represented by the PTS received this time and the value represented by the PTS received the last time. The third embodiment is similar to the first embodiment except for these respects. In FIG. 10, composing elements common to the first embodiment shown in FIG. 1 and the third embodiment are designated by same reference numerals.

The time information buffer 301 stores the value represented by the PCR, the value represented by the STC, an amount of change in the STC, and the difference between the value represented by the PTS received this time and the value represented by the PTS received the last time.

Figure 11:
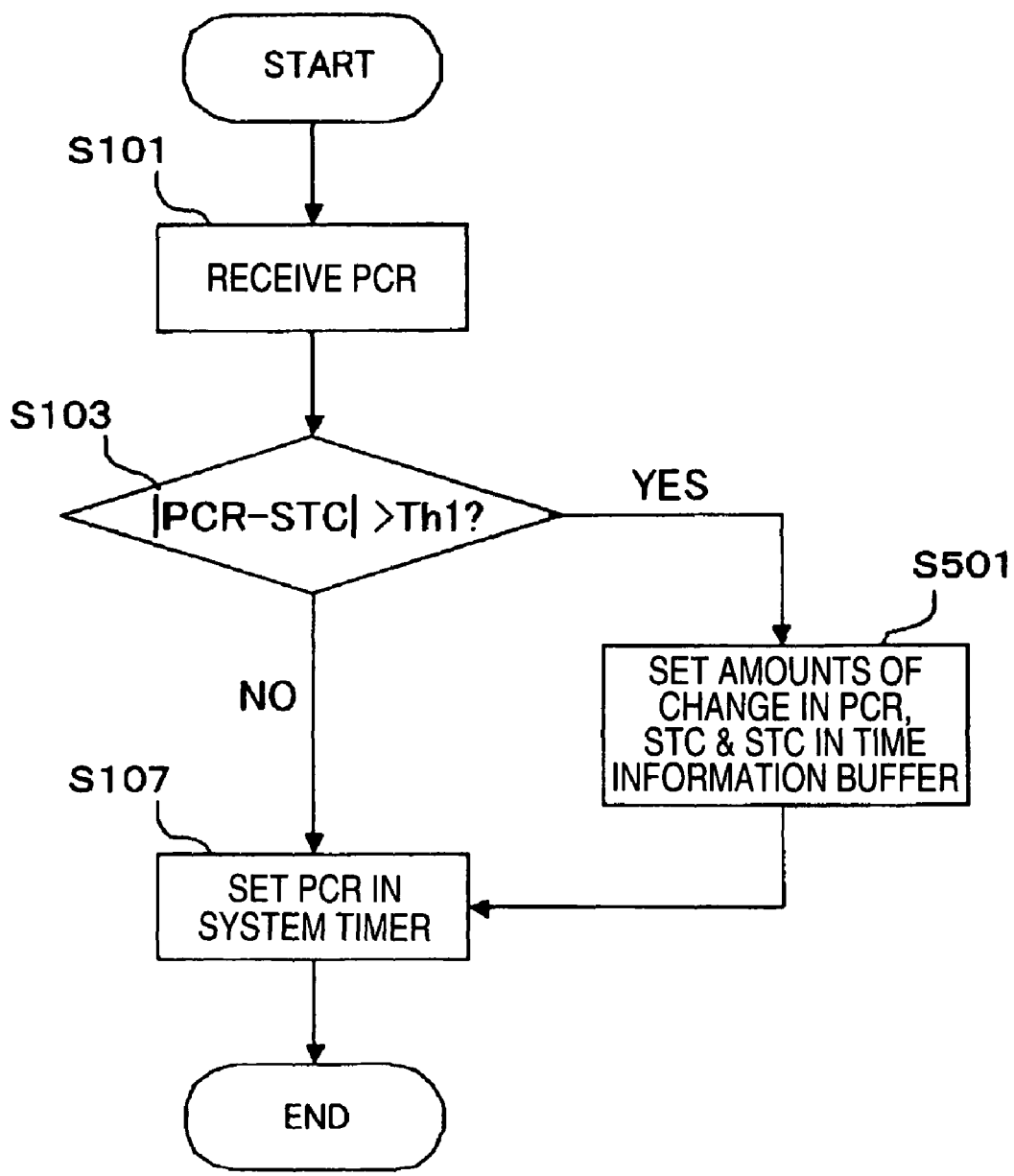
FIG. 11 is a flowchart illustrating an operation of a synchronous control portion of the third embodiment, which is performed when receiving a PCR from a multiplexing/demultiplexing portion.

FIG. 11 is a flowchart illustrating an operation of the synchronous control portion 303 according to the third embodiment at the time of receiving a PCR from the multiplexing/demultiplexing portion 101. The operation illustrated in FIG. 11 differs from the operation of the first embodiment illustrated in FIG. 2 in that processing in step S501 is performed instead of processing in step S105. In step S501, the synchronous control portion 303 causes the time information buffer 301 to store the value represented by the PCR, the value represented by the STC acquired from the system timer 105, an amount of change in the value represented by the STC per predetermined time. Thus, if the synchronous control portion 303 determines in step S103 that the value represented by the PCR is discontinuous, a time, which is before the continuity of the value represented by the PCR is broken, along a time base can be measured.

Figure 12:
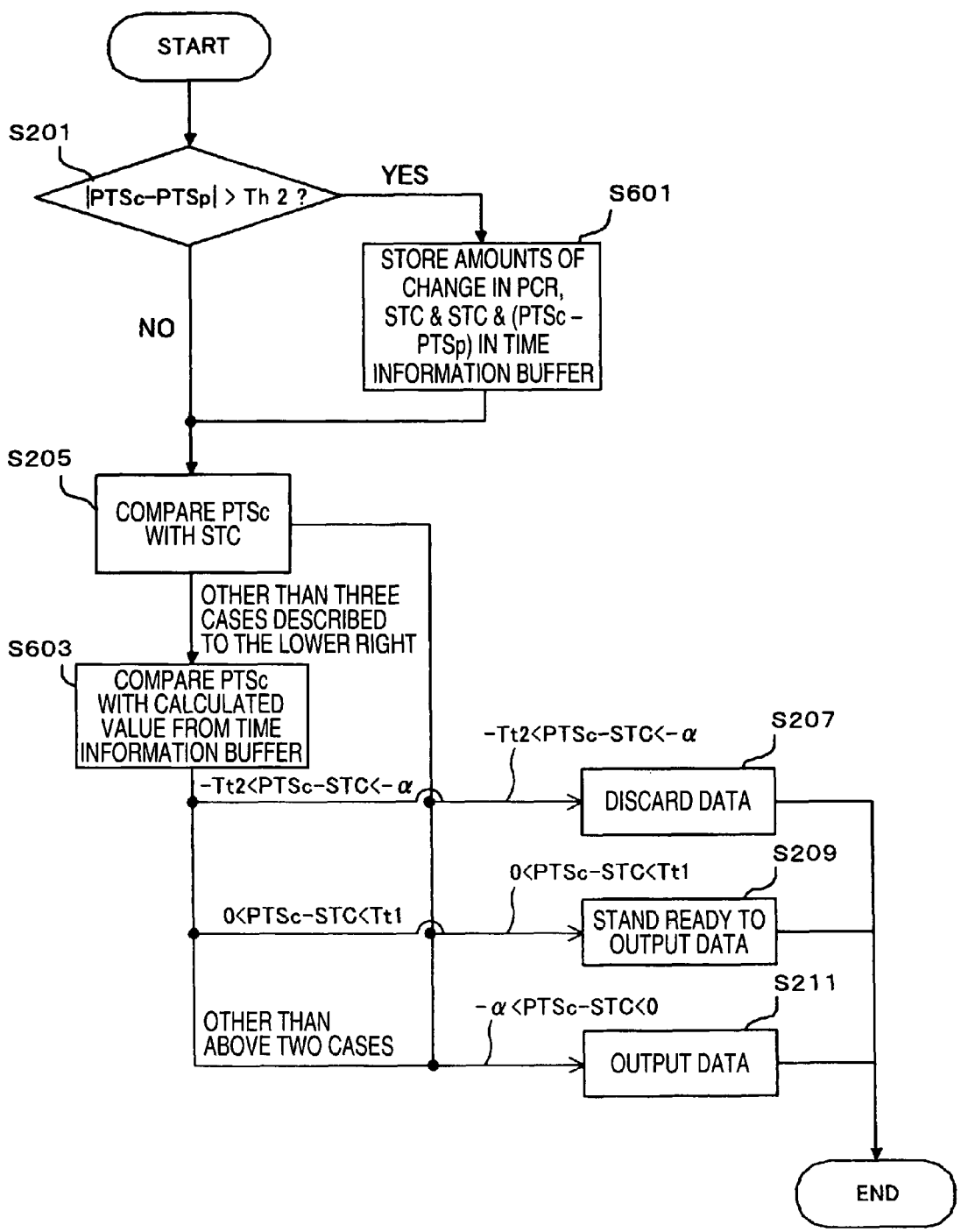
FIG. 12 is a flowchart illustrating an operation of the synchronous control portion of the third embodiment, which is performed when receiving a PTS from a video control portion or an audio control portion.

FIG. 12 is a flowchart illustrating an operation of the synchronous control portion 303 according to the third embodiment at the time of receiving a PTS from the video control portion 115 or the audio control portion 123. The operation illustrated in the flowchart shown in FIG. 12 differs from the operation of the first embodiment illustrated in the flowchart shown in FIG. 3 in that processing in step S603 is performed instead of processing in step S203, and in that processing in step S603 is performed instead of processing in step S213. In step S601, the synchronous control portion 303 causes the time information buffer 301 to store the value represented by the PCR, the value represented by the STC, an amount of change in the STC per predetermined time, and the difference ("PTSc−PTSp") between the value represented by the PTS (PTSc) received this time and the value represented by the PTS (PTSp) received the last time. Also, in step S603, the synchronous control portion 303 compares a value represented by the PTSc with a value calculated from information stored in the time information buffer 301. Thus, if the synchronous control portion 303 determines in step S201 that the value represented by the PTS is discontinuous, a time, which is after the continuity of the value represented by the PTS is broken, along a time base can be measured.

The stream data processing apparatus and the stream data processing method according to the invention can be applied to a use of performing a desired synchronous control operation even in a case where the continuity of values respectively represented by the reference time information (PCR) and the reproduction time information (PTS) is broken when decoding and outputting data obtained by demultiplexing multiplexed stream data by the MPEG system.

What is claimed is:

1. A stream data processing apparatus, comprising:
a demultiplexing portion configured to demultiplex multiplexed stream data, to which reference time information is added, into a plurality of pieces of stream data to which reproduction time information is added;
a system time measuring portion configured to measure a system time according to the reference time information;
a synchronous control portion configured to determine continuity of a reference time according to reference time information and system time information, to determine continuity of a reproduction time according to the reproduction time information and the system time information, and to output synchronous control information according to results of the determinations;
a storage portion configured to store stream data;
a decoding portion configured to decode stream data stored in said storage portion;
an output portion configured to output decoded data; and
a decoded data output control portion configured to control a mode of an operation of handling decoded data to be output by said output portion, according to the synchronous control information, and characterized in that:
the synchronous control information designates output of the data obtained by decoding the stream data, standby to output the data obtained by decoding the stream data, or discarding of the data obtained by decoding the stream data, and wherein in a case where a difference between a reference time represented by the reference time information and a system time represented by the system time information exceeds a predetermined threshold value, said synchronous control portion determines that the continuity of the reference time is broken;

in a case where a first reproduction time represented by the reproduction time information and a second reproduction time represented by previous reproduction time information exceeds a second threshold value, said synchronous control portion determines that the continuity of the reproduction time is broken, said stream data processing apparatus further comprising:

a time measuring unit configured to measure a time, wherein in a case where said synchronous control portion determines that the continuity of the reference time is broken, said synchronous control portion sets a system time represented by the system time information in said time measuring unit, and subsequently sets the reference time represented by the reference time information in said system time measuring portion; and in a case where said synchronous control portion determines that the continuity of the reproduction time is broken, said synchronous control portion sets a time obtained by adding a difference between the first reproduction time and the second reproduction time to the system time in said time measuring unit.

2. The stream data processing apparatus according to claim 1, wherein said synchronous control portion outputs, in a case where a difference between the first reproduction time and the system time is outside a predetermined range, synchronous control information corresponding to a difference between the first reproduction time and a time measured by said time measuring unit.

3. A stream data processing apparatus, comprising:

a demultiplexing portion configured to demultiplex multiplexed stream data, to which reference time information is added, into a plurality of pieces of stream data to which reproduction time information is added;

a system time measuring portion configured to measure a system time according to the reference time information;

a synchronous control portion configured to determine continuity of a reference time according to reference time information and system time information, to determine continuity of a reproduction time according to the reproduction time information and the system time information, and to output synchronous control information according to results of the determinations;

a storage portion configured to store stream data;

a decoding portion configured to decode stream data stored in said storage portion;

an output portion configured to output decoded data; and a decoded data output control portion configured to control a mode of an operation of handling decoded data to be output by said output portion, according to the synchronous control information, and characterized in that:

the synchronous control information designates output of the data obtained by decoding the stream data, standby to output the data obtained by decoding the stream data, or discarding of the data obtained by decoding the stream data, and wherein in a case where a difference between a reference time represented by the reference time information and a system time represented by the system time information exceeds a predetermined threshold value, said synchronous control portion determines that the continuity of the reference time is broken;

in a case where a first reproduction time represented by the reproduction time information and a second reproduction time represented by previous reproduction time information exceeds a second threshold value, said synchronous control portion determines that the continuity of the reproduction time is broken said stream data processing apparatus further comprising:

a memory portion, wherein in a case where said synchronous control portion determines that the continuity of the reference time is broken, said synchronous control portion sets a difference between a system time represented by the system time information and the reference time represented by the reference time information in said memory portion, and subsequently sets the reference time represented by the reference time information in said system time measuring portion; and in a case where said synchronous control portion determines that the continuity of the reproduction time is broken, said synchronous control portion sets a difference between the first reproduction time and the second reproduction time in said memory portion.

4. The stream data processing apparatus according to claim 3, wherein said synchronous control portion outputs, in a case where a difference between the first reproduction time and the system time is outside a predetermined range, synchronous control information corresponding to a difference between the first reproduction time and a time obtained by adding the difference that is stored by said memory portion.

5. A stream data processing apparatus, comprising:

a demultiplexing portion configured to demultiplex multiplexed stream data, to which reference time information is added, into a plurality of pieces of stream data to which reproduction time information is added;

a system time measuring portion configured to measure a system time according to the reference time information;

a synchronous control portion configured to determine continuity of a reference time according to reference time information and system time information, to determine continuity of a reproduction time according to the reproduction time information and the system time information, and to output synchronous control information according to results of the determinations;

a storage portion configured to store stream data;

a decoding portion configured to decode stream data stored in said storage portion;

an output portion configured to output decoded data; and a decoded data output control portion configured to control a mode of an operation of handling decoded data to be output by said output portion, according to the synchronous control information, and characterized in that:

the synchronous control information designates output of the data obtained by decoding the stream data, standby to output the data obtained by decoding the stream data, or discarding of the data obtained by decoding the stream data, and wherein in a case where a difference between a reference time represented by the reference time information and a system time represented by the system time information exceeds a predetermined threshold value, said synchronous control portion determines that the continuity of the reference time is broken;

in a case where a first reproduction time represented by the reproduction time information and a second reproduction time represented by previous reproduction time information exceeds a second threshold value, said synchronous control portion determines that the continuity of the reproduction time is broken said stream data processing apparatus further comprising:

a memory portion, and wherein, in a case where said synchronous control portion determines that the continuity of the reference time is broken, said synchronous control portion sets the reference time represented by the reference time information, the system time represented by the system time information, and an amount of change in the system time in said memory portion, and subsequently sets the reference time represented by the reference time information in said system time measuring portion; and in a case where said synchronous control portion determines that the continuity of the reproduction time is broken, said synchronous control portion causes said memory portion to store the reference time represented by the reference time information, the system time represented by the system time information, the amount of change in the system time, and a difference between the first reproduction time and the second reproduction time.

6. The stream data processing apparatus according to claim 5, wherein said synchronous control portion outputs, in a case where a difference between the first reproduction time and the system time is outside a predetermined range, synchronous control information corresponding to a difference between the first reproduction time and a value calculated from information stored in said memory portion.

7. A stream data processing method comprising the steps of:

demultiplexing multiplexed stream data, to which reference time information is added, into a plurality of pieces of stream data to which reproduction time information is added;

measuring a system time according to the reference time information;

determining continuity of a reference time according to reference time information and system time information, and determining continuity of a reproduction time according to the reproduction time information and the system time information, and outputting synchronous control information according to results of the determinations; and controlling a mode of an operation of handling data, which is obtained by decoding the stream data, according to the synchronous control information;

wherein the synchronous control information designates output of the data obtained by decoding the stream data, standby to output the data obtained by decoding the stream data, or discarding of the data obtained by decoding the stream data;

in a case where a difference between a reference time represented by the reference time information and a system time represented by the system time information exceeds a predetermined threshold value, it is determined that the continuity of the reference time is broken, in a case where a first reproduction time represented by the reproduction time information and a second reproduction time represented by previous reproduction time information exceeds a second threshold value, it is determined that the continuity of the reproduction time is broken, in a case where said synchronous control portion determines that the continuity of the reference time is broken, a system time represented by the system time information is set in said time measuring unit, and subsequently, the reference time represented by the reference time information is set in said system time measuring portion; and in a case where said synchronous control portion determines that the continuity of the reproduction time is broken, a time obtained by adding a difference between the first reproduction time and the second reproduction time to the system time is set in said time measuring unit.

8. The stream data processing method according to claim 7, wherein said synchronous control portion outputs, in a case where a difference between the first reproduction time and the system time is outside a predetermined range, synchronous control information corresponding to a difference between the first reproduction time and a time measured by said time measuring unit.

9. The stream data processing method according to claim 7, wherein in a case where said synchronous control portion determines that the continuity of the reference time is broken, a difference between a system time represented by the system time information and the reference time represented by the reference time information is in said memory portion, and subsequently, the reference time represented by the reference time information is set in a system time measuring portion; and in a case where said synchronous control portion determines that the continuity of the reproduction time is broken, a difference between the first reproduction time and the second reproduction time is set in said memory portion.

10. The stream data processing method according to claim 9, wherein in a case where a difference between the first reproduction time and the system time is outside a predetermined range, synchronous control information corresponding to a difference between the first reproduction time and a time obtained by adding the difference stored by said memory portion to the system is output.

11. A stream data processing method, characterized by comprising the steps of:

demultiplexing multiplexed stream data, to which reference time information is added, into a plurality of pieces of stream data to which reproduction time information is added;

measuring a system time according to the reference time information;

determining continuity of a reference time according to reference time information and system time information, and determining continuity of a reproduction time according to the reproduction time information and the system time information, and outputting synchronous control information according to results of the determinations; and controlling a mode of an operation of handling data, which is obtained by decoding the stream data, according to the synchronous control information, wherein the synchronous control information designates output of the data obtained by decoding the stream data, standby to output the data obtained by decoding the stream data, or discarding of the data obtained by decoding the stream data, in a case where a difference between a reference time represented by the reference time information and a system time represented by the system time information exceeds a predetermined threshold value, it is determined that the continuity of the reference time is broken, in a case where a first reproduction time represented by the reproduction time information and a second reproduction time represented by previous reproduction time information exceeds a second threshold value, it is determined that the continuity of the reproduction time is broken, in a case where it is determined that the continuity of the reference time is broken, said synchronous control portion sets the reference time represented by the reference time information, the system time represented by the system time information, and an amount of change in the system time are stored in a memory portion, and subsequently, the reference time represented by the reference time information is set in a system time measuring portion; and in a case where it is determined that the continuity of the reproduction time is broken, the reference time represented by the reference time information, the system time represented by the system time information, the amount of change in the system time, and a difference between the first reproduction time and the second reproduction time are stored in said memory portion.

12. The stream data processing method according to claim 11, wherein said synchronous control portion outputs, in a case where a difference between the first reproduction time and the system time is outside a predetermined range, synchronous control information corresponding to a difference between the first reproduction time and a value calculated from information stored in said memory portion is output.

* * * * *